(12) United States Patent
MacFarlane et al.

(10) Patent No.: US 9,401,053 B2
(45) Date of Patent: Jul. 26, 2016

(54) FAULT NOTIFICATIONS FOR VEHICLES

(71) Applicant: GM GLOBAL TECHNOLOGY OPERATIONS LLC, Detroit, MI (US)

(72) Inventors: Brian A. MacFarlane, Fenton, MI (US); Michael J. Abowd, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/481,705

(22) Filed: Sep. 9, 2014

(65) Prior Publication Data

US 2016/0071332 A1   Mar. 10, 2016

(51) Int. Cl.
| | |
|---|---|
| G07C 5/00 | (2006.01) |
| B60K 35/00 | (2006.01) |
| F02D 29/02 | (2006.01) |
| F16H 61/16 | (2006.01) |

(52) U.S. Cl.
CPC ............... G07C 5/006 (2013.01); B60K 35/00 (2013.01); F02D 29/02 (2013.01); F16H 61/16 (2013.01)

(58) Field of Classification Search
CPC ...... G07C 5/008; G07C 5/0808; G07C 5/006; B60C 11/24; B60R 25/1003; B60R 25/1004; B60R 25/102; B60R 25/2018; B60R 25/33; B60W 2050/0215; B60W 2050/041; B60W 2050/043; B60W 50/04; G01L 17/00
USPC ............... 701/29.1, 29.5, 34.4, 468; 382/209; 340/438; 320/104
See application file for complete search history.

(56) References Cited

U.S. PATENT DOCUMENTS

| | | | | |
|---|---|---|---|---|
| 2002/0026281 | A1* | 2/2002 | Shibata | G08G 1/123 701/29.1 |
| 2003/0190076 | A1* | 10/2003 | DeLean | G06F 21/32 382/209 |
| 2006/0111822 | A1* | 5/2006 | Simon | B60R 25/1003 701/468 |
| 2008/0084285 | A1* | 4/2008 | Bhogal | B60C 11/24 340/438 |
| 2009/0254240 | A1* | 10/2009 | Olsen, III | G06Q 10/06 701/29.5 |
| 2011/0127947 | A1* | 6/2011 | Hunter | H02J 7/0031 320/104 |
| 2013/0261884 | A1* | 10/2013 | Richards | B60W 50/04 701/34.4 |
| 2014/0107887 | A1* | 4/2014 | Bissontz | G01R 31/006 701/34.4 |

* cited by examiner

*Primary Examiner* — James Trammell
*Assistant Examiner* — Sanjeev Malhotra
(74) *Attorney, Agent, or Firm* — Ingrassia Fisher & Lorenz, P.C.

(57) ABSTRACT

Methods and systems are provided for providing fault notifications for vehicles. A notification unit is configured to provide a notification when a fault is detected for a vehicle. A processor is coupled to the notification unit, and is configured to provide instructions to the notification unit to provide the notification when the fault is detected, and restrict operation of the vehicle, when the fault is detected, until an action is taken in response to the notification.

20 Claims, 7 Drawing Sheets

FAULT NOTIFICATIONS FOR VEHICLES

TECHNICAL FIELD

The present disclosure generally relates to the field of vehicles and, more specifically, to methods and systems for providing fault notifications for vehicles, such as automobiles.

BACKGROUND

Certain vehicles today provide notices when a fault has been detected within the vehicle or one of its components. For example, a diagnostic code or icon may illuminate on a front dashboard display of the vehicle. However, certain individuals may not always adhere to the notifications provided within the vehicle.

Accordingly, it is desirable to provide improved methods and systems for providing fault notifications for vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method includes providing a notification when a fault is detected for a vehicle, and restricting operation of the vehicle, via a processor, when the fault is detected, until an action is taken in response to the notification.

In accordance with another exemplary embodiment, a system is provided. The system comprises a notification unit and a processor. The notification unit is configured to provide a notification when a fault is detected for a vehicle. The processor is coupled to the notification unit, and is configured to provide instructions to the notification unit to provide the notification when the fault is detected, and restrict operation of the vehicle, when the fault is detected, until an action is taken in response to the notification.

In accordance with a further exemplary embodiment, a vehicle is provided. The vehicle includes a drive system, a notification unit, and a processor. The notification unit is configured to provide a notification when a fault is detected for the vehicle. The processor is coupled to the notification unit, and is configured to provide instructions to the notification unit to provide the notification when the fault is detected, and restrict operation of the drive system, when the fault is detected, until an action is taken in response to the notification.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
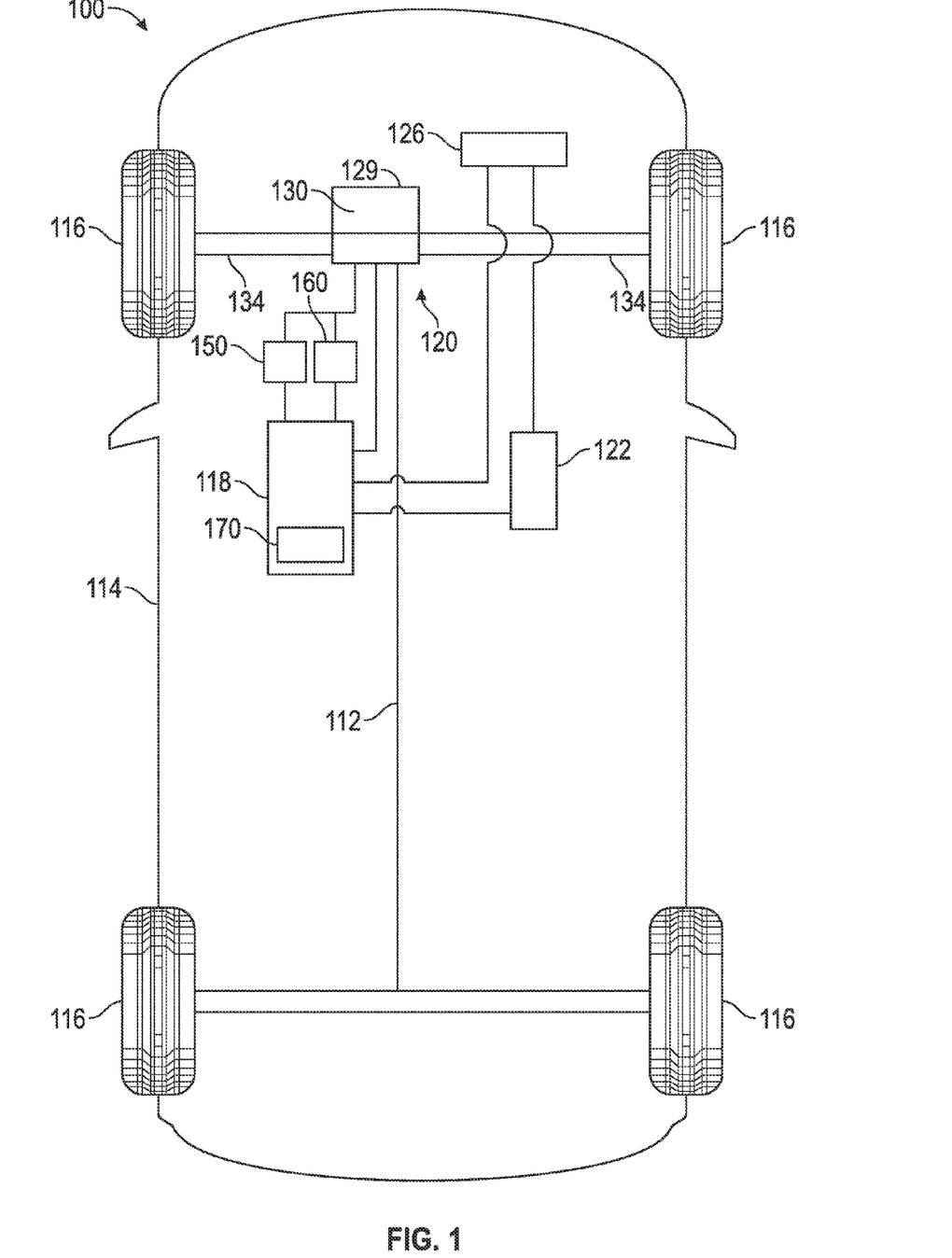
FIG. 1 is a functional block diagram of a vehicle that includes an engine and a control system that controls an engine start and a notification of any faults detected within the vehicle, in accordance with an exemplary embodiment.

FIG. 1 illustrates a vehicle 100, or automobile, according to an exemplary embodiment. The vehicle 100 is also referenced at various points throughout this Application as "the vehicle." As described in greater detail further below, the vehicle 100 includes an engine 130 and a control system 170 for controlling an engine start of the engine 130 and a notification of any faults detected within the vehicle 100 (including steps to help ensure that the notifications are adhered to, such as requiring an acknowledgment or action by the driver before operating the vehicle 100), in accordance with the steps of one or more of the processes 300, 400, 500, 600, and/or 700 as described further below in connection with FIGS. 3-7.

As depicted in FIG. 1, the vehicle 100 includes a chassis 112, a body 114, four wheels 116, an electronic control system 118, a steering system 150, a braking system 160, a rechargeable energy storage system (RESS) 122, and the above-referenced control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In one embodiment, the engine 130 comprises a gas combustion engine. In another embodiment, the vehicle 100 may comprise a battery electric vehicle in which the engine 130 comprises an electric motor, the RESS comprises a high voltage vehicle battery that powers the engine 130, and the vehicle 100 further includes a drive system comprising an actuator assembly 120, the above-referenced RESS 122, and a power inverter assembly (or inverter) 126, wherein the actuator assembly 120 includes at least one electric propulsion system 129 mounted on the chassis 112 that includes the engine 130 and drives the wheels 116. As will be appreciated by one skilled in the art, in certain embodiments the engine (or motor) 130 includes a transmission therein, and, although not illustrated, may also include a stator assembly (including conductive coils), a rotor assembly (including a ferromagnetic core), and a cooling fluid or coolant.

Still referring to FIG. 1, the engine 130 is integrated such that it is mechanically coupled to at least some of the wheels 116 through one or more drive shafts 134. As mentioned above, in one embodiment, the vehicle 100 includes a gas combustion engine 130. In another embodiment, the vehicle 100 comprises a battery electric vehicle. In certain other embodiments, the vehicle 100 may comprise a hybrid electric vehicle (HEV) that has a combustion engine along with an electric motor. In such other embodiments, the vehicle 100 may comprise a "series HEV" (in which a combustion engine is not directly coupled to the transmission, but coupled to a generator which is used to power the electric motor 130) or a "parallel HEV" (in which a combustion engine is directly coupled to the transmission by, for example, having the rotor of the electric motor 130 rotationally coupled to the drive shaft of the combustion engine).

In one embodiment, the RESS 122 is mounted on the chassis 112. In one embodiment, the RESS 122 comprises a battery having a pack of battery cells. In one embodiment, the RESS 122 comprises a lithium iron phosphate battery, such as a nanophosphate lithium ion battery. In one embodiment, the RESS 122 comprises a high voltage battery that, along with an electric propulsion system(s) 129, provides a drive system to propel the vehicle 100 (in one such embodiment, the RESS 122 is also coupled to an inverter 126, as depicted in FIG. 1).

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 100, inputs via a cruise control resume switch (not depicted), and various other inputs for various vehicle devices and/or systems, such as one or more vehicle radios, other entertainment systems, environmental control systems, lightning units, navigation systems, and the like (also not depicted). In one embodiment, the braking system 160 includes both a regenerative braking capability and a friction braking capability for the vehicle 100.

The control system 170 is mounted on the chassis 112, and is coupled to the engine 130. As noted above, the control system 170 controls an engine start of the engine 130 and a notification of any faults detected within the vehicle 100 (including steps to help ensure that the notifications adhered to, such as requiring an acknowledgment or action by the driver before operating the vehicle 100), in accordance with the steps of one or more of the processes 300, 400, 500, and/or 600 as described further below in connection with FIGS. 3-7. In one embodiment, the control system 170 comprises an engine control module (ECM) for generally controlling the engine 130. In addition, in one embodiment depicted in FIG. 1, the control system 170 is part of the electronic control system (ECS) 118 that also controls one or more operations of other vehicle components such as, by way of example, the inverter 126 (if applicable), the RESS 122, the steering system 150, and the braking system 160.

Figure 2:
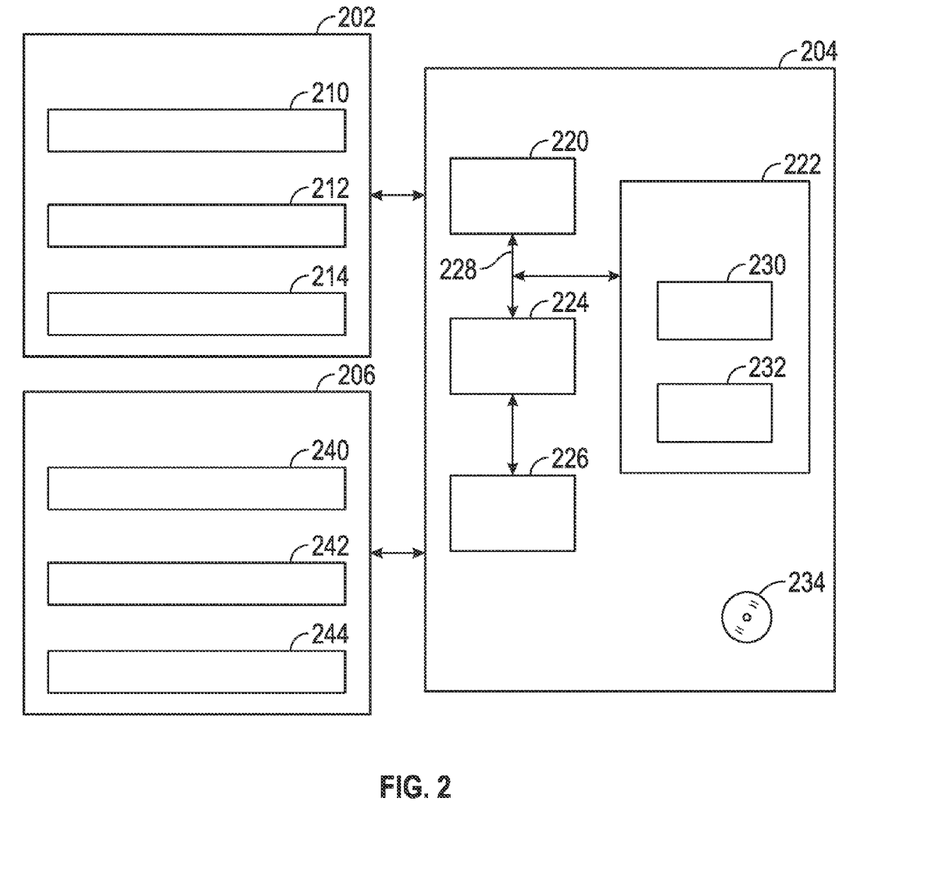
FIG. 2 is a functional block diagram of the control system of FIG. 1, in accordance with an exemplary embodiment.

With reference to FIG. 2, a functional block diagram is provided for the control system 170, in accordance with an exemplary embodiment. As depicted in FIG. 2, the control system 170 includes a sensor array 202, a controller 204, and a notification unit 206.

The sensor array 202 measures and obtains information for use by the controller 204 in controlling an engine start of the engine 130 and a notification of any faults detected within the vehicle 100. In the depicted embodiment, the sensor array 202 includes an ignition sensor 210, a transmission sensor 212, and one or more component sensors 214. The ignition sensor 210 measures or detects a state of the ignition of the vehicle 100 of FIG. 1, for example as to whether a driver is attempting to start the ignition of the vehicle 100 (e.g. by turning the keys for the vehicle 100). The transmission sensor measures or detects a state of the gear or transmission of the vehicle 100, for example as to whether the vehicle 100 is in a park, drive, and/or reverse mode. The component sensors 214 detect or measure information used to determine any faults in the vehicle 100 and/or components thereof. By way of example, in certain embodiments the component sensors 214 may include wheel speed sensors, transmission range position sensors, electric park brake sensors, processor integrity sensors, circuit diagnostic sensors, and/or one or more various other types of sensors. In one embodiment, each of the sensors of the sensor array 202 provides the measured or detected information to the controller 204 for processing in accordance with the processes 300, 400, 500, 600, and 700 of FIGS. 3-7. The specific number and/or type(s) of the sensors of the sensor array 202 may vary in different embodiments.

The controller 204 is coupled to the sensor array 202 and to the notification unit 206 (discussed further below). The controller 204 controls an engine start of the engine 130 of FIG. 1 and a notification of any faults detected within the vehicle 100 (including steps to help ensure that the notifications are adhered to, such as requiring an acknowledgment or action by the driver before operating the vehicle 100), based on the information provided by the sensor array 202, and using the notification unit 206, in accordance with the steps of one or more of the processes 300, 400, 500, and/or 600 as described further below in connection with FIGS. 3-7.

As depicted in FIG. 2, the controller 204 comprises a computer system. In certain embodiments, the controller 204 may also include one or more of the sensors of the sensor array 202 and/or one or more components of the notification unit 206. In addition, it will be appreciated that the controller 204 may otherwise differ from the embodiment depicted in FIG. 2. For example, the controller 204 may be coupled to or may otherwise utilize one or more remote computer systems and/or other control systems.

In the depicted embodiment, the computer system of the controller 204 includes a processor 220, a memory 222, an interface 224, a storage device 226, and a bus 228. The processor 220 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 204 and the computer system of the controller 204, preferably in executing the steps of the processes described herein, such as the steps of the processes 300, 400, 500, and 600 (and any sub-processes thereof) in connection with FIGS. 3-7.

The memory 222 can be any type of suitable memory. In various embodiments, this may include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (e.g., threshold values) for use in implementing the measurements from the sensor array 202.

The bus 228 serves to transmit programs, data, status and other information or signals between the various components of the computer system of the controller 204. The interface 224 allows communication to the computer system of the controller 204, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as, in certain embodiments, hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 300 (and any sub-processes thereof) of FIG. 3, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

As depicted in FIG. 2, the notification unit 206 is coupled to the controller 204. In one embodiment, the notification unit 206 provides appropriate notifications for the driver of the vehicle 100, based on instructions provided by the controller 204 (and, specifically, by the processor 220 thereof) when a fault is detected. In one embodiment, the notification unit 206 comprises a visual unit 240 on the dash board of the vehicle 100 that provides a visual statement of the nature of the detected fault along with any required action by the driver. In addition, in certain embodiments, such notifications may be provided to the driver of the vehicle 100 via an audio unit 242 (e.g., via a verbal statement as to the nature of the fault and any required action and/or audible alarm). In addition, in the depicted embodiment the notification unit 206 also includes an input unit 244 whereby the driver of the vehicle 100 can respond accordingly with input values that represent an acknowledgement of the fault by the driver and/or an indication that the fault has been corrected (e.g. by a service center), as may be required by the controller 204 before the driver is allowed to operate the vehicle 100. In certain embodiments, the input unit 244 may be separate from the notification unit 206, among other possible variations for the notification unit 206.

Figure 3:
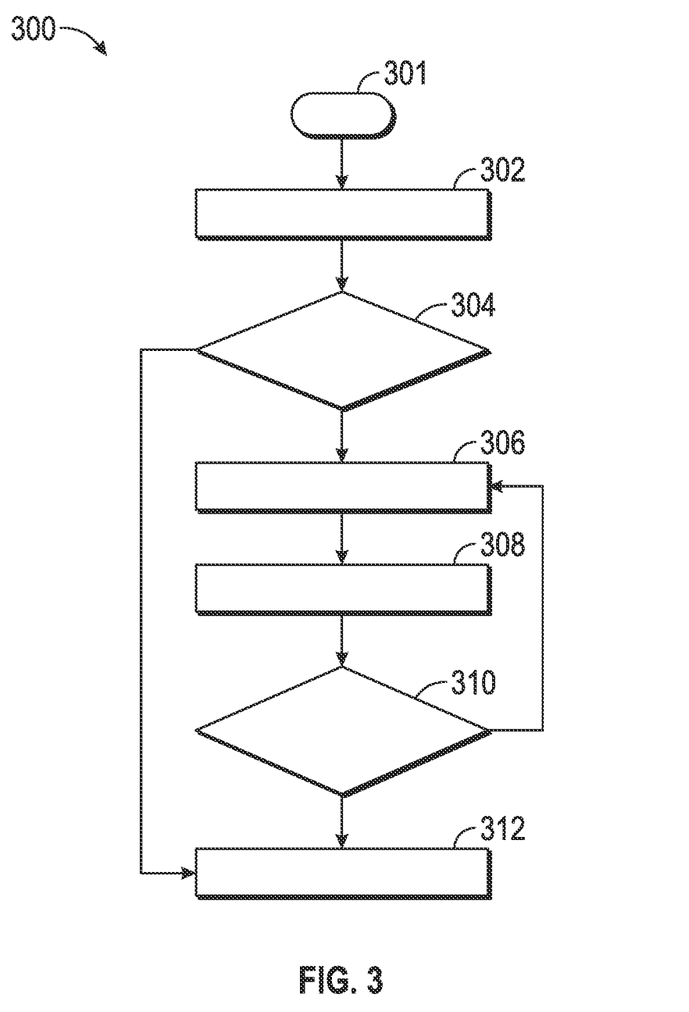
FIGS. 3-7 are flowcharts of processes for providing notification of a vehicle fault, and that can be used in conjunction with the vehicle of FIG. 1 and the control system of FIGS. 1 and 2, in accordance with exemplary embodiments.

FIG. 3 is a flowchart of a process 300 for providing fault notifications for a vehicle, in accordance with an exemplary embodiment. The process 300 can be used in connection with the vehicle 100 of FIG. 1 and the control system 170 of FIGS. 1 and 2, in accordance with an exemplary embodiment. In one embodiment, the process 300 begins when a driver provides an intention to operate the vehicle, such as when the driver attempts to shift the gear of the car from a "park" mode to a "drive" or "reverse" mode or to a "neutral" mode, or when the driver turns the keys or otherwise conveys an intent to start the engine 130 of the vehicle 100 of FIG. 1. In certain other embodiments, the process 300 may begin based on one or more other criteria, such as when the engine is determined to be running or when a hybrid propulsion system is determined to be active.

As depicted in FIG. 3, once the process 300 starts (denoted as 301 in FIG. 3), data is received (step 302). In one embodiment, data is received from the processor 220 of FIG. 2 from the component sensors 214 of FIG. 2 with information as to whether there is a fault in the vehicle 100 or a component of the vehicle 100. In one embodiment, the information is obtained by the processor 220 from the sensor array 202 via a vehicle communications bus (e.g., a CAN bus). In one such embodiment, the information received by the processor 220 includes raw sensor information used by the processor 220 to determine whether any such faults exist. In another embodiment, the information received by the processor 220 already includes determinations (e.g. made by one or more other vehicle processors and/or systems) as to whether any such faults exist.

A determination is made as to whether a latent fault exists for the vehicle or one of its components (step 304). In one embodiment, this determination is made by the processor 220 of FIG. 2 based on the information obtained in step 302. As used herein, a "latent fault" is a vehicle fault wherein it may still be possible to operate the vehicle with the latent fault, but that the latent fault could contribute to a hazard if not repaired or corrected. In one embodiment, a "latent fault" refers to situations in which multiple faults (e.g., three faults, in one embodiment) need to occur, one after another, to lead to a vehicle hazard. In one such example, when the vehicle is one fault away from the hazard (e.g., if two faults have occurred and one fault remains have failed and one remains, in one example in which three faults may be required to create a hazard), the two faults that have occurred may be considered to be "latent faults" in that the vehicle can still operate with these latent faults present (but if the last fault occurs, a hazard occurs). Accordingly the driver would be advised to take the vehicle into the dealer for servicing so that the latent fault(s) that have occurred can be repaired.

If it is determined that a latent fault does not exist, then the driver is allowed to operate the vehicle (step 312). In one embodiment, this is accomplished via instructions provided by the processor 220 of FIG. 2.

Conversely, if it is determined that a latent fault is present, then a notification is provided (step 306). In various embodiments, the notification is provided by the notification unit 206 via instructions provided by the processor 220 of FIG. 2. In one embodiment, a visual notification is provided via the visual unit 240 of FIG. 2, for example including a statement as to the type of fault and the type of action required by the driver. Also in certain embodiments an audio notification may also be provided via the audio unit 242.

In addition, in various embodiments, operation of the vehicle is also restricted or prohibited in step 308 if it is determined that a latent fault is present. Specifically, in one embodiment, the processor 220 of FIG. 2 provides instructions so that the engine 130 of FIG. 1 does not start until the driver provides a predetermined action in response to the notification (for example, in various embodiments, acknowledging the fault is present). In another embodiment, the processor 220 of FIG. 2 provides instructions to keep or maintain the transmission mode in a "park" mode (e.g., by prohibiting or denying any requests to move the transmission mode from the "park" mode) until the driver's action has been taken.

A determination is made as to whether the required action has been taken (step 310). In one embodiment, in step 310 the processor 220 of FIG. 2 determines whether the driver of the vehicle has provided an appropriate input (e.g., the above referenced acknowledgement that the fault is present) via the input unit 244 of FIG. 2.

If it is determined that the required action has been performed (e.g., that the required input has been received), then the process proceeds to the above-referenced step 312, as the driver is allowed to operate the vehicle. Conversely, if it is determined that the required action has not yet been performed, then the process instead returns to steps 306, as the notification continues to be provided in step 306 and the vehicle operation is still restricting or prohibited in step 308. Steps 306-310 thereafter repeat until a determination is made in an iteration of step 310 that the required action has been taken, at which time vehicle operation is allowed in step 312.

Figure 4:
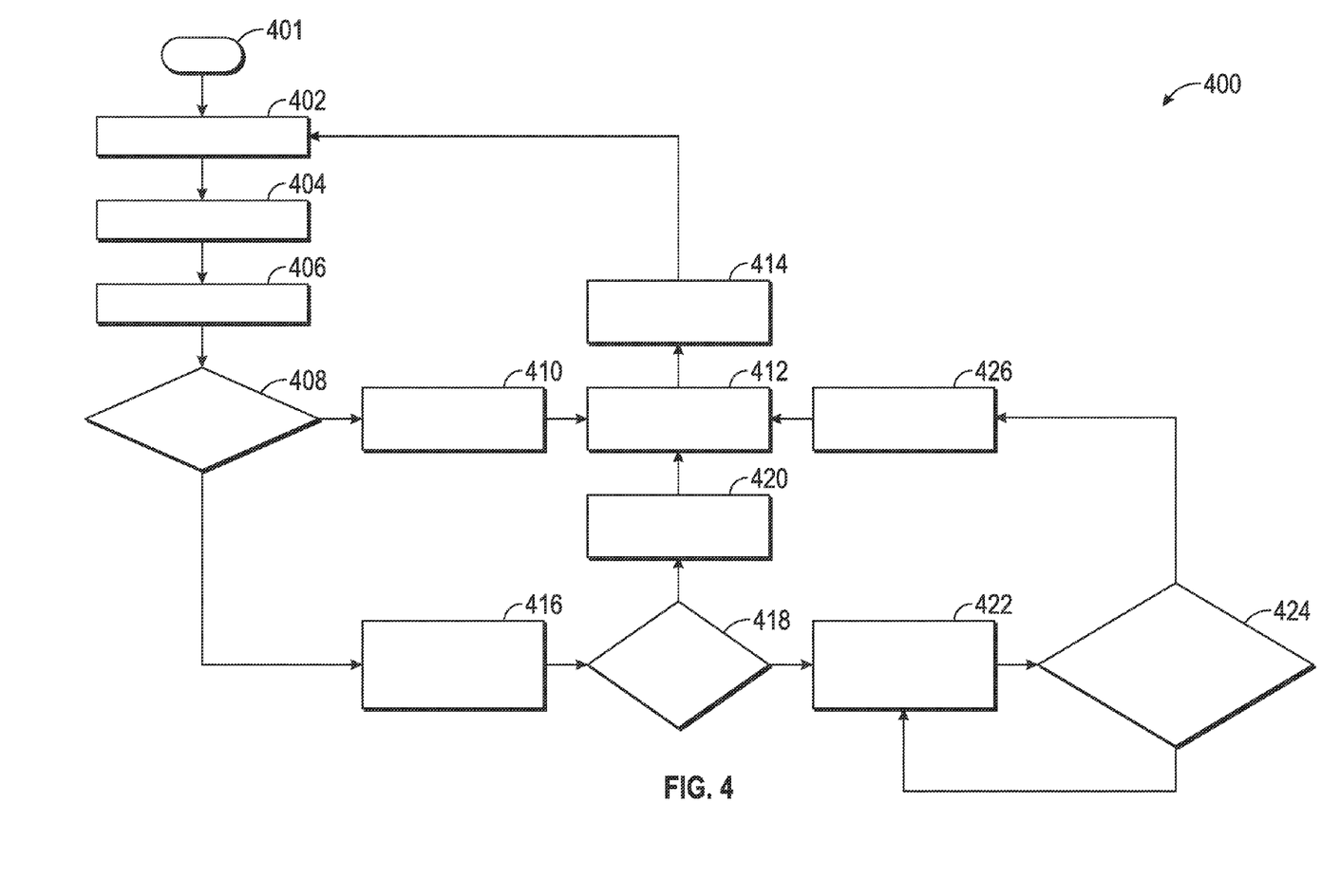
Figure 5:
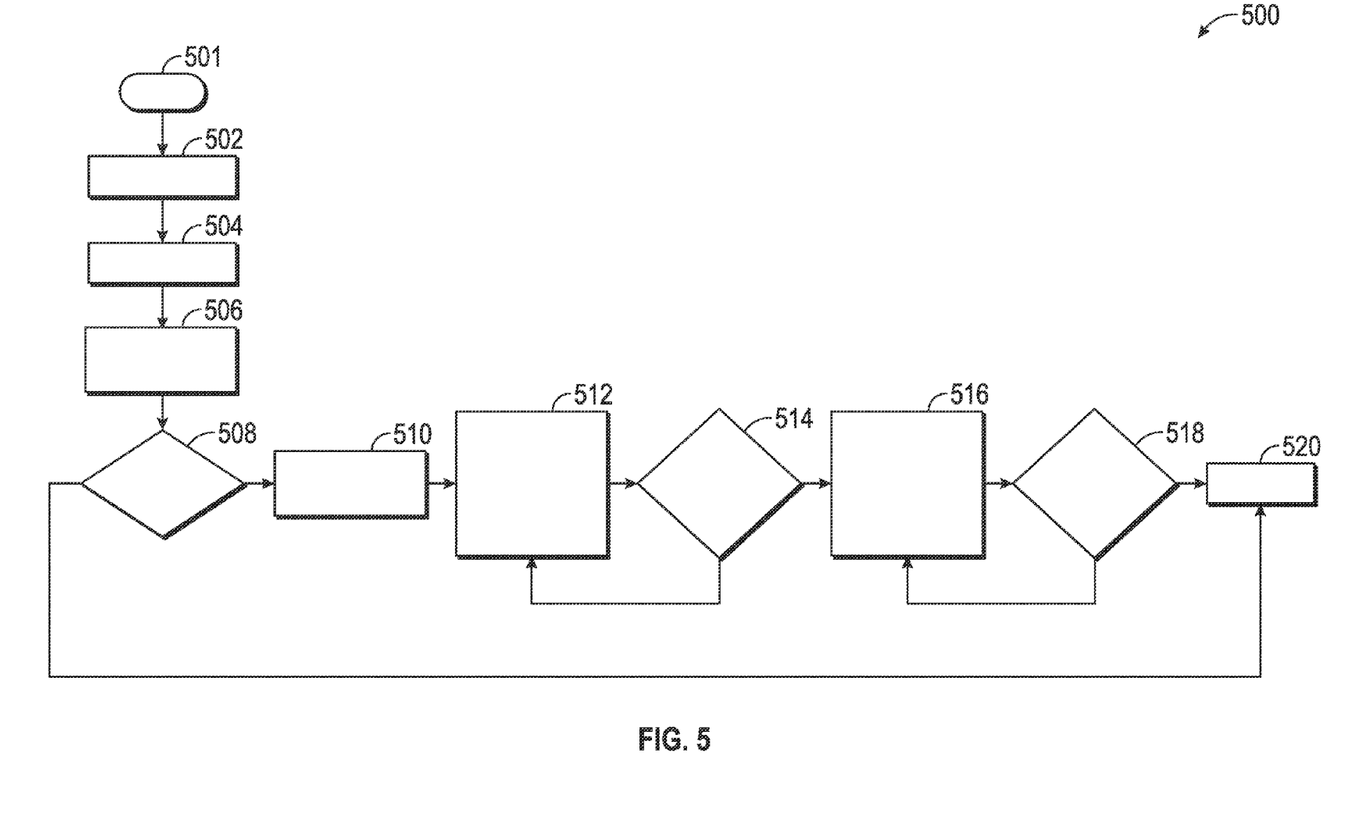
Figure 6:
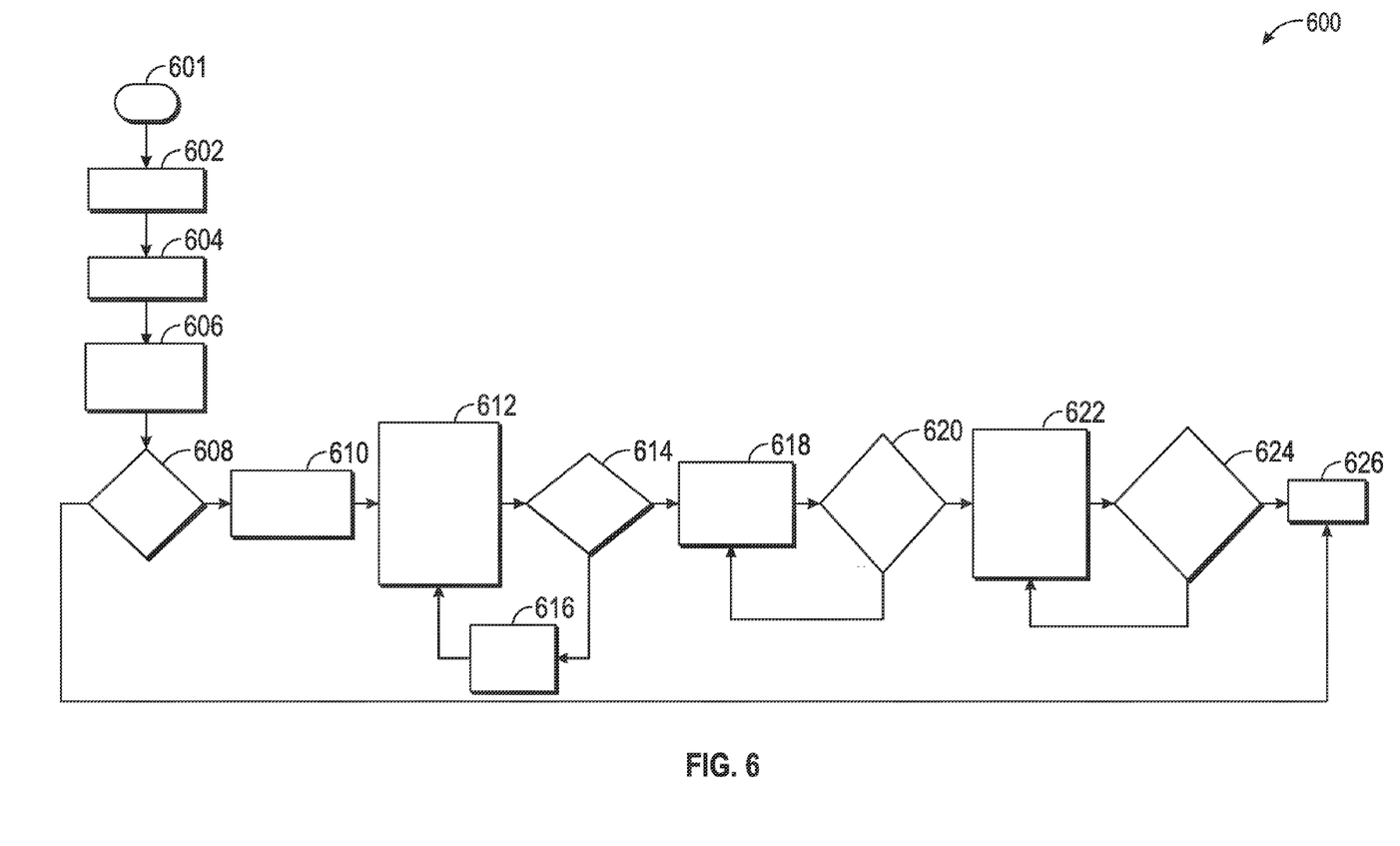
Figure 7:
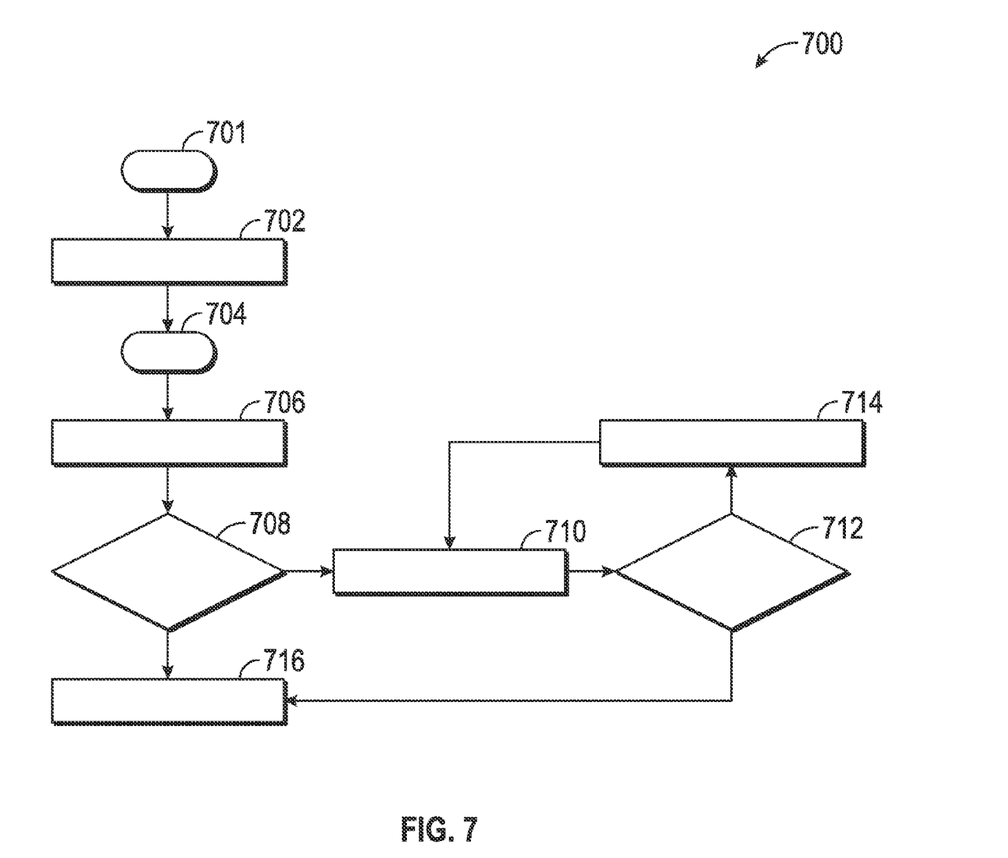

FIGS. 4-7 depict various respective versions of the process 300 of FIG. 3; namely, in accordance with respective processes 400 of FIG. 4, 500 of FIG. 5, 600 of FIGS. 6, and 700 of FIG. 7, in accordance with exemplary embodiments. Unless otherwise noted herein, the steps of the processes 400, 500, and 600 are similar to, and are intended to be a subset of, and provide a more detailed description of, the process 300 of FIG. 3.

With reference to FIG. 4, in one embodiment, the process 400 includes keeping or maintaining the transmission mode in a "park" mode (e.g., by prohibiting or denying any requests to move the transmission mode from the "park" mode) after a predetermined number of vehicle ignition cycles in which the fault notification has been provided, in accordance with an exemplary embodiment. As depicted in FIG. 4, once the process 400 starts (denoted as 401 in FIG. 4), data is received in step 402 (corresponding to step 302 of FIG. 3). Similar to the discussion above with respect to the process 300 of FIG. 3, in one embodiment the data includes information as to faults for the vehicle 100 and/or sensor information used to determine such faults. In addition, at this point in the process 400, the vehicle is in a "park" transmission mode, and no action is yet provided to start the vehicle (step 404).

A park exit request is received (step 406). In one embodiment, the transmission sensor 212 of FIG. 2 detects that a driver of the vehicle is intending to change the transmission mode of the vehicle from a "park" mode to another mode (e.g., "drive" or "reverse"). In one embodiment, this is determined, at least in part, by the processor 220 of FIG. 2, based on information provided by the transmission sensor 212 of FIG. 2.

A determination is made as to whether a latent fault is present (step 408). In one embodiment, this determination is made by the processor 220 of FIG. 2 based on information received from one or more sensors and/or from one or more other processors and/or systems of the vehicle 100, similar to the manner described above in connection with step 304 of FIG. 3.

If a latent fault is not present, a key cycle limit counter is re-set (step 410). In one embodiment, this is performed by the processor 220 of FIG. 2. In addition, in step 412, the transmission mode of the vehicle is allowed to exit from the "park" mode. In one embodiment, step 412 is also performed via instructions provided by the processor 220 of FIG. 2. In one embodiment, once the transmission mode is returned to "park" following a subsequent action by the driver to place the transmission mode back into the "park" mode (step 414), the process returns to step 402.

Conversely, if a latent fault is present, a notification is provided for the driver (step 416). In one embodiment, the notification is provided by the notification unit 206 of FIG. 2 via instructions provided by the processor 220 of FIG. 2, similar to the discussion of step 306 of FIG. 3. In addition, in one embodiment, the notification of step 416 includes both (1) a display warning identifying the fault; and (2) a display identifying a number as to how many key cycles (also referred to herein as vehicle ignition cycles) are remaining before operation of the vehicle will be prohibited. In one embodiment, the key cycle limit is stored in the memory 222 of FIG. 2 as one of the stored values 232 thereof. In one such embodiment, the key cycle limit may comprise approximately fifty (50) key cycles; however, this may vary in other embodiments. In addition, in certain embodiments one or more parking events (e.g. the number of times the vehicle is placed in a "park" transmission mode) may be utilized and tallied, instead of or in addition to the number of vehicle ignition cycles.

A determination is made as to whether the key cycle limit has been exceeded (step 418). In one embodiment, this determination is made by the processor 220 of FIG. 2.

If it is determined that the key cycle limit has not been exceeded, then the key cycle limit counter is incremented (step 420). In one embodiment, this is performed by the processor 220 of FIG. 2. The process then proceeds to the above-referenced step 412, as the exit from the "park" transmission mode is allowed.

Conversely, if it is determined that the key cycle limit has been exceeded, then further action is taken (step 422). Specifically, in one embodiment, a further notification/warning is provided to the effect that the park exit is prohibited, and the transmission mode of the vehicle is not allowed to be moved from the "park" mode. In one embodiment, the notification/warning is provided by the notification unit 206 of FIG. 2 (e.g., via the visual and/or audio units 240, 242) based on instructions provided by the processor 220 of FIG. 2. Also in one embodiment, the transmission remains kept or maintained in the "park" mode (i.e., preventing the transmission from shifting out of the park mode) based on instructions provided by the processor 220.

A determination is made as to whether the required action has been provided (step 424). In one embodiment, step 424 comprises a determination as to whether a code has been entered (e.g. via the input unit 244 of FIG. 2) indicating that the fault has been corrected (e.g. by a technician at a service station) and/or whether another input has been entered (e.g. via the input unit 244 of FIG. 2) as to whether the vehicle 100 has passed a latent fault diagnostic check (e.g. by a technician at a service station) and/or as to whether the latent fault has otherwise been corrected (e.g. on its own). In one embodiment, the determination(s) are provided by the processor 220 of FIG. 2 based on information detected and provided by the input unit 244 of FIG. 2.

If it is determined that the required action has not been taken, then the process returns to step 422. Steps 422 and 424 thereafter repeat until a determination is made in an iteration of step 424 that the required action has been taken.

Once it is determined that the required action has been taken, then the process proceeds to step 426. During step 426, the key cycle limit counter is re-set. In one embodiment, this is performed by the processor 220 of FIG. 2. In addition, the process then proceeds to the above-referenced step 412, as the driver is allowed to shift the transmission out of the "park" mode (e.g. to the "drive" or "reverse" mode, or to "neutral") and is allowed to operate the vehicle.

With reference to FIG. 5, in one embodiment, the process 500 prevents the engine 130 of FIG. 1 from starting until the driver provides an acknowledgement of the notification. As depicted in FIG. 5, once the process 500 starts (denoted as 501 in FIG. 5), data is received in step 502 (corresponding to step 302 of FIG. 3). Similar to the discussion above with respect to the process 300 of FIG. 3, in one embodiment the data includes information as to faults for the vehicle 100 and/or sensor information used to determine such faults. In addition, in one embodiment, at this point in the process 500, the vehicle is in a "park" transmission mode, with the ignition turned off, and no action is yet provided to start the vehicle (step 504).

A request for a power mode crank is received (step 506). In one embodiment, the ignition sensor 210 of FIG. 2 detects that a driver of the vehicle is intending to start the engine 130 of FIG. 1 by turning a key in the ignition (or, in some embodiments, by engaging an ignition switch or providing another indication). In one embodiment, this is determined, at least in part, by the processor 220 of FIG. 2, based on information provided by the ignition sensor 210 of FIG. 2.

A determination is made as to whether a latent fault is present (step 508). In one embodiment, this determination is made by the processor 220 of FIG. 2 based on information received from one or more sensors and/or from one or more other processors and/or systems of the vehicle 100, similar to the manner described above in connection with step 304 of FIG. 3.

If a latent fault is not present, then the process proceeds to step 520. During step 520, the engine is allowed to start. In one embodiment, step 520 is performed via instructions provided by the processor 220 of FIG. 2.

Conversely, if a latent fault is present, then the process proceeds instead to step 510. During step 510, the engine is transitioned to a power mode accessory run. In one embodiment, during step 510, this is performed based on instructions provided by the processor 220 of FIG. 2.

In addition, a notification is also provided, in step 512, if a latent fault is present. In one embodiment, the notification is provided by the notification unit 206 of FIG. 2 via instructions provided by the processor 220 of FIG. 2, similar to the discussion of step 306 of FIG. 3. In addition, in one embodiment, the notification of step 512 includes (1) a display warning identifying the fault; and (2) a display notice that the driver can provide an input to "dismiss" the message/warning (e.g. by pressing a button of the input unit 244 of FIG. 2) to acknowledge the notification (and the latent fault) and thereby start the engine. In one embodiment, also as part of step 512, a message dismissal feature is enabled for the user (e.g. by providing the user with an option to engage a button to dismiss the message and allow for the engine to start).

A determination is made as to whether a required action has been provided (step 514). In one embodiment, step 514 comprises a determination as to whether the driver has acknowledged the warning by dismissing the message (e.g. by clicking on a "dismiss" button on the notification unit 206 of FIG. 2, as detected via the input unit 244 of FIG. 2). In one embodiment, the determination(s) are provided by the processor 220 of FIG. 2 based on information detected and provided by the input unit 244 of FIG. 2.

If it is determined that the required action has not been taken (e.g., if the driver has not acknowledged the message), then the process returns to step 512. Steps 512 and 514 thereafter repeat until a determination is made in an iteration of step 514 that the required action has been taken. In one embodiment, this is performed by the processor 220 of FIG. 2.

Once it is determined that the required action has been taken (e.g., if the driver has acknowledged the message), then the crank powermode of the engine 130 is enabled (step 516). In one embodiment, the crank powermode is enabled via instructions provided by the processor 220 of FIG. 2. In addition, in one embodiment, further notifications are provided as part of, or concurrent with, step 516. In one embodiment, the further notifications are provided by the notification unit 206 of FIG. 2 via instructions provided by the processor 220 of FIG. 2. In addition, in one embodiment, the further notifications of step 516 include (1) a display warning identifying the fault; and (2) a display notice indicating that an Engine Start has been Allowed.

A determination is made as to whether the driver has requested that the engine be started (step 518). In one embodiment, this comprises a determination by the processor 220 of FIG. 2 as to whether the driver has provided an ignition request (such as by turning the keys of the ignition), based on information detected and/or provided by the ignition sensor 210 of FIG. 2.

If it is determined that the driver has requested that the engine be started, then the engine is started accordingly (step 520). In one embodiment, the processor 220 provides instructions to start the engine (e.g., allowing the engine to start as normal, for example by allowing a non-depicted starter motor to engage with a crank shaft of the engine 130, to thereby crank start the engine 130). In another embodiment (e.g. for a hybrid vehicle), propulsion may be enabled for the vehicle in step 520.

Conversely, if it is determined that the driver has not requested that the engine be started, then the process returns to step 516. Steps 516 and 518 thereafter repeat (with the crank powermode enabled and the notifications provided in step 516) until a determination is made in an iteration of step 518 that the driver has requested that the engine be started, at which point the engine is started in step 520.

With reference to FIG. 6, in one embodiment, the process 600 includes a preventing of the engine 130 of FIG. 1 from starting until the driver provides an acknowledgement of the notification and a countdown timer has also expired. As depicted in FIG. 6, once the process 600 starts (denoted as 601 in FIG. 6), data is received in step 602 (corresponding to step 302 of FIG. 3). Similar to the discussion above with respect to the process 300 of FIG. 3, in one embodiment the data includes information as to faults for the vehicle 100 and/or sensor information used to determine such faults. In addition, in one embodiment, at this point in the process 600, the vehicle is in a "park" transmission mode, with the ignition turned off, and no action is yet provided to start the vehicle (step 604).

A request for a power mode crank is received (step 606). In one embodiment, the ignition sensor 210 of FIG. 2 detects that a driver of the vehicle is intending to start the engine 130 of FIG. 1 by turning a key in the ignition (or, in some embodiments, by engaging an ignition switch or providing another indication). In one embodiment, this is determined, at least in part, by the processor 220 of FIG. 2, based on information provided by the ignition sensor 210 of FIG. 2.

A determination is made as to whether a latent fault is present (step 608). In one embodiment, this determination is made by the processor 220 of FIG. 2 based on information received from one or more sensors and/or from one or more other processors and/or systems of the vehicle 100, similar to the manner described above in connection with step 304 of FIG. 3.

If a latent fault is not present, then the process proceeds to step 626. During step 626, the engine is allowed to start. In one embodiment, step 626 is performed via instructions provided by the processor 220 of FIG. 2.

Conversely, if a latent fault is present, then the process proceeds instead to step 610. During step 610, the engine is transitioned to a power mode accessory run. In one embodiment, during step 610, this is performed based on instructions provided by the processor 220 of FIG. 2.

In addition, a notification is also provided, in step 612, if a latent fault is present. In one embodiment, the notification is provided by the notification unit 206 of FIG. 2 via instructions provided by the processor 220 of FIG. 2, similar to the discussion of step 306 of FIG. 3. In addition, in one embodiment, the notification of step 612 includes (1) a display warning identifying the fault; and (2) a display notice indicating an amount of time that is remaining on a countdown timer (i.e. an amount of time for which the warning must be displayed before dismissal may occur). In one embodiment, also as part of step 612, a message dismissal feature is disabled (i.e., until the countdown timer has expired).

A determination is made as to whether the countdown timer of step 612 has expired (step 614). In one embodiment, this determination is made by the processor 220 of FIG. 2.

If it is determined that the timer has not expired, then an updated notification is provided as to an updated time remaining in the countdown timer as the timer continues to run (step 616). In one embodiment, the updated notification is provided by the notification unit 206 of FIG. 2 (e.g. via the visual unit 240 and/or the audio unit 242) based on instructions provided by the processor 220 of FIG. 2. The process then returns to step 612, and steps 612-616 repeat until a determination is made in an iteration of step 614 that the timer has expired.

Once it is determined that the timer has expired, an updated notification is provided (step 618). In one embodiment, the notification is provided by the notification unit 206 of FIG. 2 via instructions provided by the processor 220 of FIG. 2. In addition, in one embodiment, the notification of step 618 includes (1) a display warning identifying the fault; and (2) a display notice that the driver can provide an input to "dismiss" the message/warning (e.g. by pressing a button of the input unit 244 of FIG. 2) to acknowledge the notification (and the latent fault) and thereby start the engine. In one embodiment, also as part of step 618, a message dismissal feature is enabled for the user (e.g. by providing the user with an option to engage a button to dismiss the message and allow for the engine to start).

A determination is made as to whether a required action has been provided (step 620). In one embodiment, step 620 comprises a determination as to whether the driver has acknowledged the warning by dismissing the message (e.g. by clicking on a "dismiss" button on the notification unit 206 of FIG. 2, as detected via the input unit 244 of FIG. 2). In one embodiment, the determination(s) are provided by the processor 220 of FIG. 2 based on information detected and provided by the input unit 244 of FIG. 2.

If it is determined that the required action has not been taken (e.g., if the driver has not acknowledged the message), then the process returns to step 618. Steps 618 and 620 thereafter repeat until a determination is made in an iteration of step 620 that the required action has been taken. In one embodiment, this is performed by the processor 220 of FIG. 2.

Conversely, if it is determined that the required action has been taken (e.g., if the driver has acknowledged the message), then the crank powermode of the engine 130 is enabled (step 622). In one embodiment, the crank powermode is enabled via instructions provided by the processor 220 of FIG. 2. In addition, in one embodiment, further notifications are provided as part of, or concurrent with, step 622. In one embodiment, the further notifications are provided by the notification unit 206 of FIG. 2 via instructions provided by the processor 220 of FIG. 2. In addition, in one embodiment, the further notifications of step 622 include (1) a display warning identifying the fault; and (2) a display notice indicating that an Engine Start has been Allowed.

A determination is made as to whether the driver has requested that the engine be started (step 624). In one embodiment, this comprises a determination by the processor 220 of FIG. 2 as to whether the driver has provided an ignition request (such as by turning the keys of the ignition), based on information detected and/or provided by the ignition sensor 210 of FIG. 2.

If it is determined that the driver has requested that the engine be started, then the engine is started accordingly (step 626). In one embodiment, the processor 220 provides instructions to start the engine (e.g., allowing the engine to start as normal, for example by allowing a non-depicted starter motor to engage with a crank shaft of the engine 130, to thereby crank start the engine 130). In another embodiment (e.g. for a hybrid vehicle), propulsion may be enabled for the vehicle in step 626.

Conversely, if it is determined that the driver has not requested that the engine be started, then the process returns to step 622. Steps 622 and 624 thereafter repeat (with the crank powermode enabled and the notifications provided in step 622) until a determination is made in an iteration of step 624 that the driver has requested that the engine be started, at which point the engine is started in step 626.

With reference to FIG. 7, in one embodiment, the process 700 includes a preventing of the transmission mode of the vehicle from moving from a park transmission mode until the driver provides an acknowledgement of the notification, while the engine is still allowed to run in the meantime (e.g. to allow for climate control and/or other accessories even while the vehicle remains parked). As depicted in FIG. 7, once the process 700 starts (denoted as 701 in FIG. 7), data is received in step 702 (corresponding to step 302 of FIG. 3). Similar to the discussion above with respect to the process 300 of FIG. 3, in one embodiment the data includes information as to faults for the vehicle 100 and/or sensor information used to determine such faults. In addition, in one embodiment, at this point in the process 700, the vehicle is started once requested by a driver of the vehicle, while the transmission mode of the vehicle remains in a park mode (step 704).

A request to change the transmission mode from the park mode (e.g., to a "drive", "reverse", or "neutral" mode) is received (step 706). In one embodiment, a sensor detects that the driver is intending to move a transmission mode selector of the vehicle from the park transmission mode. In one embodiment, this is determined, at least in part, by the processor 220 of FIG. 2, based on information provided by the transmission mode sensor.

A determination is made as to whether a latent fault is present (step 708). In one embodiment, this determination is made by the processor 220 of FIG. 2 based on information received from one or more sensors and/or from one or more other processors and/or systems of the vehicle 100, similar to the manner described above in connection with step 304 of FIG. 3.

If a latent fault is not present, then the process proceeds to step 716. During step 716, the transmission mode is allowed to change from the "park" mode and to the different transmission mode as requested by the driver. In one embodiment, step 716 is performed via instructions provided by the processor 220 of FIG. 2.

Conversely, if a latent fault is present, then the process proceeds instead to step 710. During step 710, a notification is also provided that a latent fault is present. In one embodiment, the notification is provided by the notification unit 206 of FIG. 2 via instructions provided by the processor 220 of FIG. 2, similar to the discussion of step 306 of FIG. 3. In addition, in one embodiment, the notification of step 710 includes (1) a display warning identifying the fault; and (2) a display notice indicating an amount of time that is remaining on a countdown timer (i.e. an amount of time for which the warning must be displayed before dismissal may occur).

A determination is made as to whether a required action has been provided (step 712). In one embodiment, step 712 comprises a determination as to whether the driver has acknowledged the warning by dismissing the message (e.g. by clicking on a "dismiss" button on the notification unit 206 of FIG. 2, as detected via the input unit 244 of FIG. 2). In one embodiment, the determination(s) are provided by the processor 220 of FIG. 2 based on information detected and provided by the input unit 244 of FIG. 2.

If it is determined that the required action has not been taken (e.g., if the driver has not acknowledged the message), then the request to change the transmission mode away from the park mode is denied (step 714), and the process returns to step 710 (as the message continues to be displayed). In one embodiment, this is performed by the processor 220 of FIG. 2.

Conversely, if it is determined that the required action has been taken (e.g., if the driver has acknowledged the message), then the process proceeds instead to the above-referenced step 716, as the transmission mode is changed from the park mode to the different transmission mode as requested by the driver. In certain embodiments, the process 700 may also include other steps from one or more of the other processes discussed above, such as the timer of the process 600.

Accordingly, methods and systems are provided for providing notifications of vehicle faults. As discussed above, the provided methods and systems provide for notifications to the driver of any vehicle faults, and require that the driver perform a certain action (such as an acknowledgement of the fault and/or that the fault has been corrected) before operating the vehicle.

It will be appreciated that the vehicle of FIG. 1, and/or the systems of FIGS. 1 and 2, including without limitation the engine 130 and the control system 170, and/or components thereof, may vary in different embodiments. It will also be appreciated that various steps of the processes 300, 400, 500, 600, and/or 700 described herein in connection with FIGS. 3-7 may vary in certain embodiments. It will similarly be appreciated that various steps of the processes 300, 400, 500, 600, and/or 700 described herein in connection with FIGS. 3-7 may occur simultaneous with one another, and/or in a different order as presented in the Figures and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method comprising:
providing a notification when a latent fault is detected for a vehicle;
restricting operation of the vehicle, via a processor, in a manner that prevents a driver from driving the vehicle, when the latent fault is detected, until an action is taken in response to the notification that acknowledges or corrects the latent fault; and
allowing the driver to operate the vehicle after the action is taken that acknowledges or corrects the latent fault.

2. The method of claim 1, wherein:
the step of providing the notification comprises providing the notification when a user attempts to start an engine of the vehicle; and
the step of restricting operation of the vehicle comprises preventing the engine from starting until the action is taken that acknowledges or corrects the latent fault.

3. The method of claim 1, wherein a request to change a transmission mode of the vehicle out of a park mode is denied until the action is taken that acknowledges or corrects the latent fault.

4. The method of claim 1, wherein:
the step of providing the notification comprises providing the notification at the beginning of each ignition cycle once the latent fault is detected; and
the step of restricting operation of the vehicle comprises restricting operation of the vehicle, after the notification has been provided for a predetermined number of ignition cycles, until the action is taken that acknowledges or corrects the latent fault.

5. The method of claim 1, wherein the action comprises an acknowledgement by the driver that the driver has reviewed the notification regarding the latent fault.

6. The method of claim 5, wherein the action comprises the driver engaging a switch on a dashboard display for the vehicle acknowledging that the driver of the vehicle has reviewed the notification regarding the latent fault.

7. The method of claim 5, further comprising:
providing a countdown timer along with the notification, the countdown comprising a minimum amount of time for which the notification must be displayed before dismissal may occur;
wherein the step of restricting operation of the vehicle comprises preventing an engine of the vehicle from starting until both the countdown timer has expired and the acknowledgement by the driver has been made.

8. The method of claim 1, wherein the action comprises an acknowledgement by the driver that the latent fault is present.

9. The method of claim 8, wherein the action comprises entering a code serving as evidence that the latent fault has been corrected by a service center.

10. A system comprising:
- a notification unit configured to provide a notification when a latent fault is detected for a vehicle; and
- a processor coupled to the notification unit, the processor configured to:
    - provide instructions to the notification unit to provide the notification when the latent fault is detected;
    - restrict operation of the vehicle, when the fault is detected, in a manner that prevents a driver from driving the vehicle, until an action is taken in response to the notification; and
    - allow the driver to operate the vehicle after the action is taken that acknowledges or corrects the latent fault.

11. The system of claim 10, wherein the processor is configured to:
- instruct the notification unit to provide the notification when a user attempts to start an engine of the vehicle; and
- prevent the engine from starting until the action is taken that acknowledges or corrects the latent fault.

12. The system of claim 10, wherein the processor is configured to provide instructions to deny a request to change a transmission mode of the vehicle out of a park mode until the action is taken that acknowledges or corrects the latent fault.

13. The system of claim 10, wherein the processor is configured to:
- instruct the notification unit to provide the notification at the beginning of each ignition cycle once the latent fault is detected; and
- restrict operation of the vehicle, after the notification has been provided for a predetermined number of ignition cycles, until the action is taken that acknowledges or corrects the latent fault.

14. The system of claim 10, wherein the action comprises an acknowledgement by the driver that the driver has reviewed the notification regarding the latent fault.

15. The system of claim 14, wherein the action comprises the driver engaging a switch on a dashboard display for the vehicle acknowledging that the driver of the vehicle has reviewed the notification regarding the latent fault.

16. The system of claim 14, wherein the processor is configured to:
- instruct the notification unit to provide a countdown timer along with the notification, the countdown comprising a minimum amount of time for which the notification must be displayed before dismissal may occur; and prevent an engine of the vehicle from starting until both the countdown timer has expired and the acknowledgement by the driver has been made.

17. The system of claim 10, wherein the action comprises an acknowledgement by the driver that the latent fault is present.

18. The system of claim 17, wherein the action comprises entering a code serving as evidence that the latent fault has been corrected by a service center.

19. A vehicle comprising:
- a drive system;
- a notification unit configured to provide a notification when a latent fault is detected for the vehicle; and
- a processor coupled to the notification unit, the processor configured to:
    - provide instructions to the notification unit to provide the notification when the latent fault is detected;
    - restrict operation of the drive system, in a manner that prevents a driver from driving the vehicle, when the fault is detected, until an action is taken in response to the notification; and
    - allow the driver to operate the vehicle after the action is taken that acknowledges or corrects the latent fault.

20. The vehicle of claim 19, wherein:
the drive system comprises an engine; and
the processor is configured to:
- instruct the notification unit to provide the notification when a user attempts to start the engine; and
- prevent the engine from starting until the action is taken that acknowledges or corrects the latent fault.

* * * * *